Patented May 28, 1935

2,002,681

UNITED STATES PATENT OFFICE 2,002,681

PROCESS FOR THE PRODUCTION OF POTASSIUM CARBAMATE

Carl Theodor Thorssell and August Kristensson, Cassel, Germany

No Drawing. Application October 24, 1928, Serial No. 314,842. In Germany November 18, 1927

5 Claims. (Cl. 260—112)

It is well known that it is not possible to prepare potassium carbonate industrially according to the Solvay process, that is to say by introducing ammonia and carbon dioxide into a solution of potassium chloride. Owing to the comparatively high solubility of the resulting $KHCO_3$ in comparison with $NH_4HCO_3$, a state of equilibrium occurs even when there is a small amount of $NH_4Cl$ and a great deal of $KCl$ in the solution. A separation of these two salts is too complicated—even if at all possible—to assure a profitable manufacture. The behavior of $NH_3CO_2$ and $H_2O$ has been dealt with hereabove. Reference is also made to Arbeiten von Terres Zeitschrift für Elektrochemie 1921, page 177 concerning these systems. In order to carry out the process, $CO_2$ is introduced in such a strong $NH_3$ solution that $NH_4CO_2NH_2$ but not $(NH_4)_2CO_3$ or $NH_4HCO_3$ is formed. The salt is separated by cooling and filtered off. In order to maintain the $NH_3$ concentration required for the formation of $NH_4CO_2NH_2$, $NH_3$ is introduced and then treated with $CO_2$ etc. Only $NH_4CO_2NH_2$ can be formed in the absence of $H_2O$, that is to say in liquid $NH_3$; $H_2O$ is required for $(NH_4)_2CO_3$ as well as for $NH_4HCO_3$.

The invention relates to the obtaining of potassium carbonate by means of potassium carbamate.

When $CO_2$ and $NH_3$ are combined in the form of gases or in solution, it is well known that a mixture of ammonium carbamate and ammonium carbonate is formed. The presence of a great deal of water in the gases or a dilute solution favours the formation of the carbonate, whereas vice versa carbamate is obtained from carbonate by a strong $K_2CO_3$ solution etc.

Moreover ammonium carbamate and ammonium chloride are very readily soluble in liquid ammonia which is anhydrous or contains very little water, whereas potassium chloride and still more, potassium carbamate are difficultly soluble therein.

According to the invention a solid potassium salt, for instance $KCl$ reacts with ammonium carbamate, the mixture being stirred thoroughly in liquid $NH_3$ which is anhydrous or contains very little water, so that solid potassium carbamate $KCO_2NH_2$, is precipitated, whereas $NH_4Cl$, $NH_4CO_2NH_2$ together with very small quantities of $KCO_2NH_2$ remain in the solution.

$$NH_4CO_2NH_2 + KCl = KCO_2NH_2 + NH_4Cl$$
solid  solid  solid  dissolved

If $KCO_2NH_2$ is mixed with a little water and heated, $NH_3$ or $NH_3$ and $CO_2$ escape, and $KHCO_3$ or $K_2CO_3$ or a mixture of these two salts remain behind. This reaction takes place even at a comparatively low temperature (below 100°).

$$2KCO_2NH_2 + H_2O = K_2CO_3 + 2NH_3 + CO_2$$

In carrying out the process, ammonium carbamate can be prepared by introducing $CO_2$ into an aqueous $NH_3$ solution, whereupon the solution is cooled and the precipitated salt separated in the pressure filter. The solution is again saturated with $NH_3$ and $CO_2$ introduced afresh.

The ammonium carbamate is then mixed by stirring with solid $KCl$ in liquid $NH_3$.

Instead of ammonium carbamate prepared in this way, for instance salt of hartshorn, prepared from $NH_3$ and $CO_2$ by methods ordinarily employed, can be used or $CO_2$ introduced directly into the liquid $NH_3$. When $(NH_4)_2CO_3$ is subjected to a strong dehydrating agent such as liquid ammonia it is immediately converted into carbamate:

$$(NH_4)_2CO_3 = NH_4CO_2NH_2 + H_2O$$

Ammonium carbamate is immediately formed by dehydration from the ammonium carbonate or ammonium bicarbonate contained in salt of hartshorn:

$$(NH_4)_2CO_3 = NH_4CO_2NH_2 + H_2O$$

or $2NH_4HCO_3 = NH_4CO_2NH_2 + 2H_2O + CO_2$ $$CO_2 + 2NH_3 = NH_4CO_2NH_2.$$

Ammonium chloride carbamate is also formed when introducing $CO_2$ in dehydrated $NH_3$. The formation into potassium carbamate always takes place by the reaction of potassium chloride with ammonium carbamate.

The reaction takes place independent of temperature and pressure, so that it is possible to work at atmospheric pressure and a correspondingly low temperature in which case the $NH_3$ is liquid, or at an increased temperature and corresponding pressure.

The precipitate after reaction is completed, and consisting of potassium carbamate and any excess of ammonium carbamate, is separated from the liquid and washed with liquid $NH_3$. The washing liquor is used for fresh mixtures, in order to carry out the process in a circuit.

The separated and washed potassium carbamate is stirred with a little water and heated, in which case NH₃ or NH₃ and CO₂ escape according to the height of the temperature and are returned to the working process.

The resulting KHCO₃ or K₂CO₃ represents the final product.

The separated liquid is a solution of NH₄Cl and NH₄CO₂NH₂ with small quantities of KCO₂NH₂ in liquid NH₃.

The NH₃ is separated from the solution in such a way that it is obtained again as liquid NH₃, which can be done either by ordinary distillation at suitable pressure or by a diminished pressure and re-compression in conjunction with cooling.

The residue which remains after the ammonia is distilled off is heated, in which case the small amounts of KCO₂NH₂ contained therein, react again with NH₄Cl to form KCl and NH₄CO₂NH₂. Upon continued heating the NH₄CO₂NH₂ decomposes into CO₂ and NH₃, which may thereupon be returned to the manufacturing process.

$$NH_4CO_2NH_2 = 2NH_3 + CO_2$$

The residue finally obtained consists of NH₄Cl and small amounts of KCl. It is stirred with water and treated by known methods in the separating apparatus with milk of lime, for the purpose of recovering the NH₃ which returns to the manufacturing process.

The new process gives surprising yields: it is possible to produce up to approximately 100% potash calculated on the potassium salt used.

Having now particularly described and ascertained the nature of our said invention and in what manner the same is to be performed we declare that what we claim is:—

1. The process of producing potassium carbamate which comprises acting on potassium chloride, dissolved in a substantially anhydrous solvent comprising liquid ammonia, with carbon dioxide.

2. The process of producing potassium carbamate which comprises acting with carbon dioxide on a mixture of potassium chloride with liquid ammonia.

3. The process of producing potassium carbamate which comprises reacting potassium chloride, substantially anhydrous liquid ammonia, and carbon dioxide.

4. The process of producing potassium carbamate which comprises reacting solid potassium chloride, substantially anhydrous liquid ammonia, and carbon dioxide.

5. The process of producing potassium carbamate, which comprises acting with ammonium carbamate on a potassium salt in anhydrous liquid ammonia.

CARL THEODOR THORSSELL.
AUGUST KRISTENSSON.